No. 609,163. Patented Aug. 16, 1898.
W. R. PARK & B. T. WILLISTON.
INJECTOR.
(Application filed June 11, 1898.)

(Model.) 7 Sheets—Sheet 1.

No. 609,163. Patented Aug. 16, 1898.
W. R. PARK & B. T. WILLISTON.
INJECTOR.
(Application filed June 11, 1898.)

(Model.) 7 Sheets—Sheet 3.

WITNESSES:
E. F. Groll.
Edward Powers

INVENTORS
William R. Park
Belvin T. Williston
by Lauge & Roberts
Attorneys.

No. 609,163. Patented Aug. 16, 1898.
W. R. PARK & B. T. WILLISTON.
INJECTOR.
(Application filed June 11, 1898.)
(Model.) 7 Sheets—Sheet 4.

Witnesses:
Eleanor F. Groll
Edward Powers

Inventors:
William R. Park
Belvin T. Williston
By Lange & Roberts,
Attorneys.

No. 609,163. Patented Aug. 16, 1898.
W. R. PARK & B. T. WILLISTON.
INJECTOR.
(Application filed June 11, 1898.)

(Model.) 7 Sheets—Sheet 5.

No. 609,163. Patented Aug. 16, 1898.
W. R. PARK & B. T. WILLISTON.
INJECTOR.
(Application filed June 11, 1898.)

(Model.) 7 Sheets—Sheet 6.

No. 609,163. Patented Aug. 16, 1898.
W. R. PARK & B. T. WILLISTON.
INJECTOR.
(Application filed June 11, 1898.)
(Model.) 7 Sheets—Sheet 7.

UNITED STATES PATENT OFFICE.

WILLIAM R. PARK, OF TAUNTON, AND BELVIN T. WILLISTON, OF SOMERVILLE, MASSACHUSETTS, ASSIGNORS TO THE HANCOCK INSPIRATOR COMPANY, OF BOSTON, MASSACHUSETTS.

INJECTOR.

SPECIFICATION forming part of Letters Patent No. 609,163, dated August 16, 1898.

Application filed June 11, 1898. Serial No. 683,180. (Model.)

*To all whom it may concern:*

Be it known that we, WILLIAM R. PARK, a resident of Taunton, county of Bristol, and BELVIN T. WILLISTON, a resident of Somerville, county of Middlesex, State of Massachusetts, citizens of the United States of America, have invented certain new and useful Improvements in Composite Injectors, of which the following is a specification.

The within-described invention relates to the construction of an injector or inspirator of composite structure wherein a pair or battery of injectors supplied each with an external handle or lever is incorporated in a single structure having a single enveloping casing in such manner that the composite injector possesses an efficient range from the lowest delivery of one of the assembled injectors to the highest delivery of both or all of the injectors collectively. The injectors of the pair or battery may be of the same size; but we prefer to assemble injectors of varying sizes, because thereby a smaller minimum delivery consistent with a given maximum delivery is made possible than if the injectors are all of the same size. For the purposes of the specification it will be sufficient to show a composite injector containing a pair of coöperating injector elements, since it is obvious that more than two may be incorporated in combination in a structure having for its object to secure a still greater range of delivery and increased maximum capacity.

A composite injector constructed in accordance with this invention is capable of exhibiting great range of delivery capacity and may also be used simultaneously as a feed-water heater and injector.

In the drawings, wherein like letters are uniformly used to designate like parts, Figure 1 is an external side elevation of the complete injector. Fig. 2 is an external end elevation of the same viewed from the operating end thereof. Fig. 3 is a plan view of the injector. Fig. 4 is a longitudinal sectional elevation along the line 1 2, Figs. 2 and 3, viewed from the left-hand side of the instrument as seen in Fig. 2. Fig. 5 is a longitudinal sectional elevation of the injector at the line 3 4, Figs. 2 and 3, viewed from the right-hand side of the injector as seen in Fig. 2. Fig. 6 shows a detail taken in transverse cross-section at the line 9 10 of Fig. 1. Fig. 7 is a longitudinal section at the line 13 14, Fig. 2, showing the disposition of the suction-passages. Fig. 8 is a cross-section at line 15 16, Fig. 7, looking from the handle end of the inspirator. Fig. 9 is a cross-section on the broken line 17 18 19 20 of Fig. 7 looking from the boiler end of the inspirator. Fig. 10 is a cross-section of the inspirator-casing at line 5 6 7 8 of Fig. 3 looking from the handle end of the inspirator, and Fig. 11 is a cross-section at the line 11 12 of Fig. 3 looking from the handle end of the inspirator.

For the individual injectors which operate conjointly in the composite injector we select the form of double-tube inspirator shown in our Patent No. 492,944, dated March 7, 1893, because we believe this to be an exceptionally efficient injector, especially for locomotive-work, for which the composite injector is also peculiarly well adapted. To the said patent, therefore, we refer for a closely-detailed description, specifying herein the coöperative parts of each injector element only so far as is convenient for a general understanding. For convenience also we use capital letters of reference in the description of the injector of Fig. 4 (the larger one of the pair combined in the composite injector) and the same letters in lower case to indicate the corresponding parts of the smaller injector, (shown in Fig. 5,) so that a description of the larger injector will suffice for both.

Referring to Fig. 4, the valve-stem V operates the lifter steam-valve V' and forcer steam-valve $V^2$ successively by a single outward movement of the handle H, which is pivoted on the main casing A by link connections H' $H^2$ $H^3$. The initial movement of the handle H admits steam to the passage $V^3$ at V', and thence to the lifter steam-tube C, whose entrance-aperture is controlled and adjusted by a reducing-valve R, operated by an external hand-wheel R'. Water is entrained into the lifter combining-tube C' from the suction-pipe W and is delivered to the lifter delivery-chamber $C^3$ through the lifter delivery-tube $C^2$. The lifted water rises to the forcer-tubes F F' and flows to the final overflow O partly through the forcer-tube, but for the most part through an intermediate-overflow port I, which is controlled by an automatic puppet-valve I'. As the handle H completes its outward movement the forcer steam-valve $V^2$ is gradually opened and the final overflow O' is gradually closed. The movement of the final-overflow valve O' is actuated from the handle H through link L, bell-crank lever $L^2 L^3 L^4$, which is pivoted to the link L at L' and to the standard $L^6$ at $L^3$, connecting-rod $L^5$, and valve-stem $O^2$, which slides in the stuffing-box bonnet $O^3$. The gradual closure of the final-overflow valve O', together with the gradual opening of steam-valve $V^2$, which delivers steam through the passage $V^3$ to the forcer steam-tube F, produces a change in the balance of pressure which forces the puppet-valve I' to its seat. At about the same time the passage of steam through the forcer steam-tube F forms a jet in the forcer combining and delivery tubes F' and $F^2$, raising the pressure in the forcer delivery-chamber $F^3$ to a point where the valve $B^3$, which controls the port $B^2$, opens the passage communicating to the boiler.

The substitution of the lower-case in distinction from the capital letters supplies the description of the smaller of the two injectors. (Shown in Fig. 5.) Each of these two injector elements has a separate suction-pipe and chamber, so that any interruption in the operation of one cannot affect the operation of the other. If it is desired to heat the feed-water, but at the same time to continue the feed to the boiler uninterrupted, one of the injectors, say the smaller one, can be made to blow back by an abrupt full movement of its handle h, Fig. 5, the suddenness of this movement closing the final-overflow valve before a jet can be established, sending the full blast of steam to the tank while the larger injector is feeding it to the boiler. Obviously if a common suction-pipe were provided for the two injector elements such manipulation would be impossible and any break in the operation of one injector would immediately throw the other out of action. The steam is taken from a common steam-pipe S, which admits steam to a dome S', from which branches $S^2 s^2$ lead to the larger and smaller injectors, respectively. From this point the injector-casing A is divided by a longitudinal partition X, which isolates from each other the series of chambers which occupy the divisions of the casing and in which the injectors are respectively located. The two steam and water passages blend again with each other in the boiler valve-chamber $B^4$, in which the boiler check-valves $B^3 b^3$ are mounted in caps B' b'. Out of this common valve-chamber the boiler-pipe B emerges, leading to the boiler. This entire structure is comprised within a single compact casing A, from which the only lateral projections of any consequence are the compartments A' a', which contain the overflow-valves O' o', respectively.

The internal construction of the injector-casing is shown by detail drawings of Figs. 6 to 11, inclusive, which supplement the longitudinal sectional drawings of Figs. 4 and 5.

Figure 7:
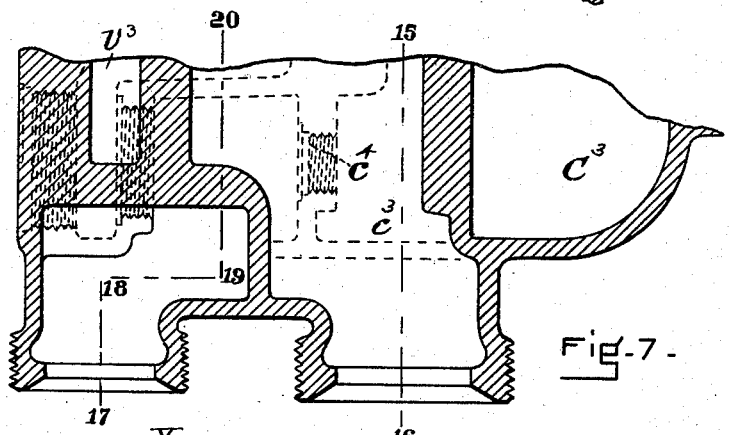
Fig. 7 is a longitudinal section of the injector-casing at the portion where the suction-pipes W w' enter the injector and is taken at the line 13 14 of Fig. 2.
Figures 8, 9:
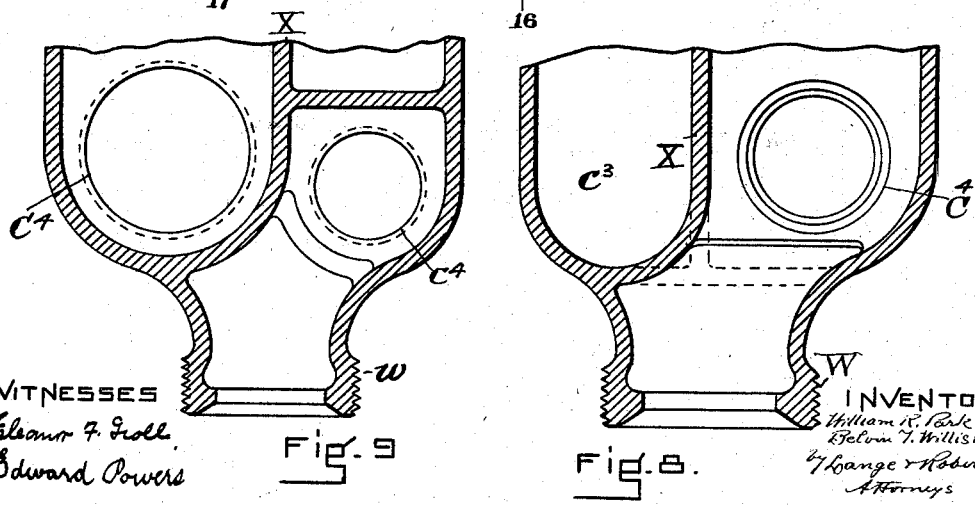

Figs. 8 and 9 serve further to explain Fig. 7. Fig. 8, which is a cross-section of Fig. 7 at line 15 16 looking from the handle end of the injector, shows the water-entrance W and the aperture $C^4$, into which is inserted the lifter combining and delivery tube C' $C^2$. Fig. 9 is a cross-section of Fig. 7 at line 17 18 19 20 viewed from the boiler end of the injector, showing the passage for the water-inlet w and the aperture $c^4$, in which is inserted the lifter combining and delivery tubes c' $c^2$. The aperture $C^4$ is also shown in this figure in its compartment, which is separated from the suction-compartment of the smaller of the two injectors by the longitudinal partition X.

Figure 1:
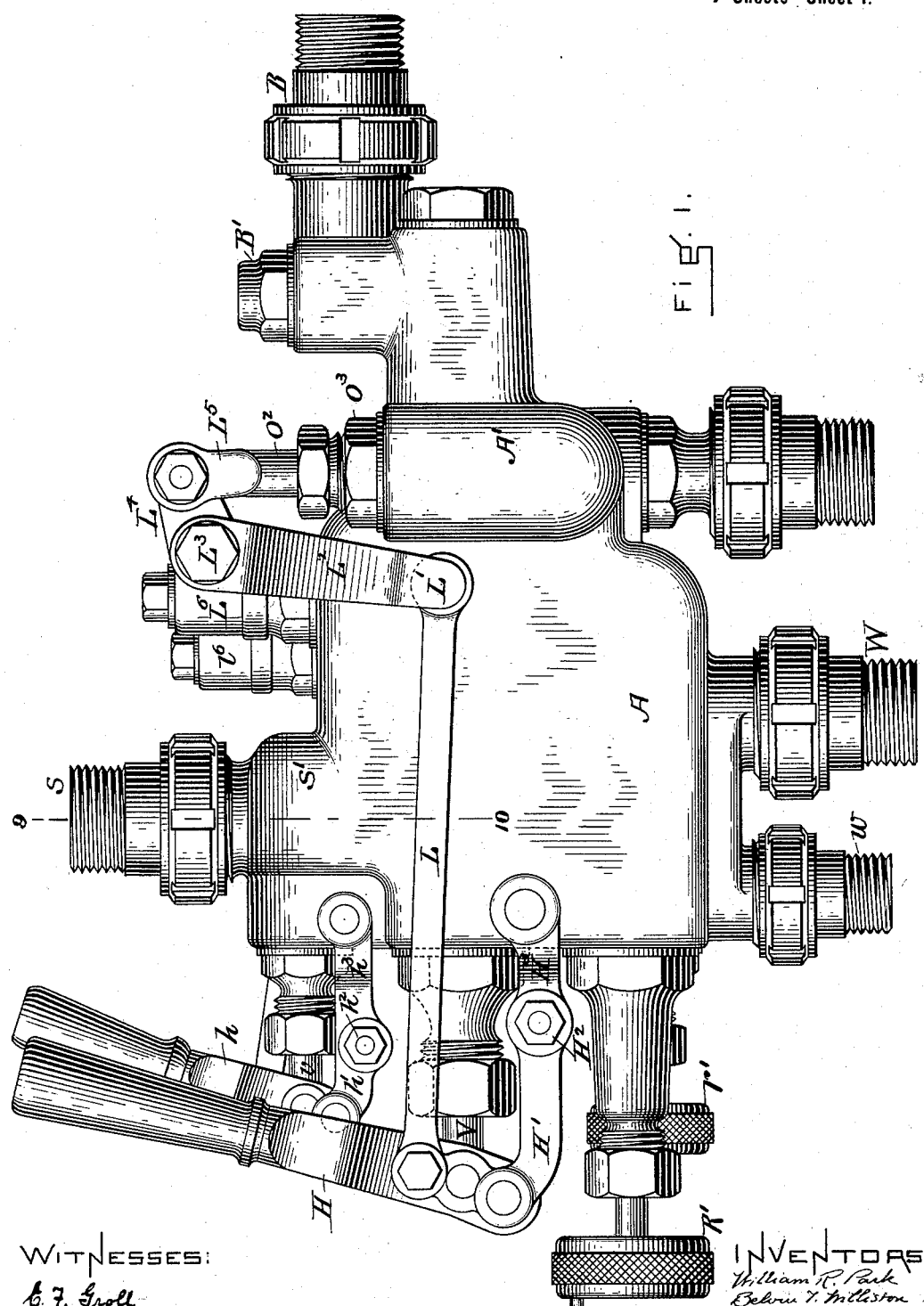
Figure 2:
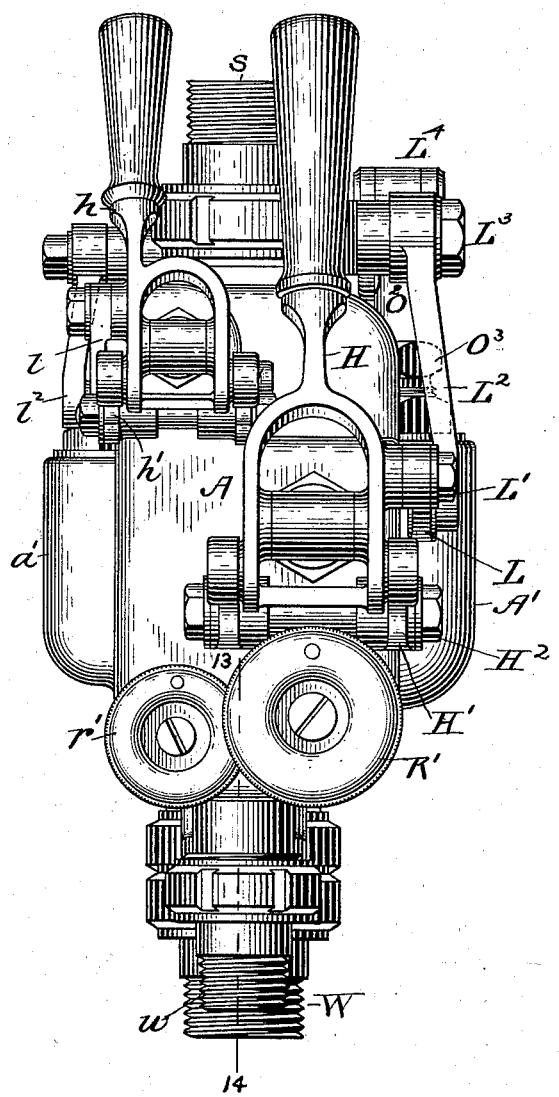
Figure 3:
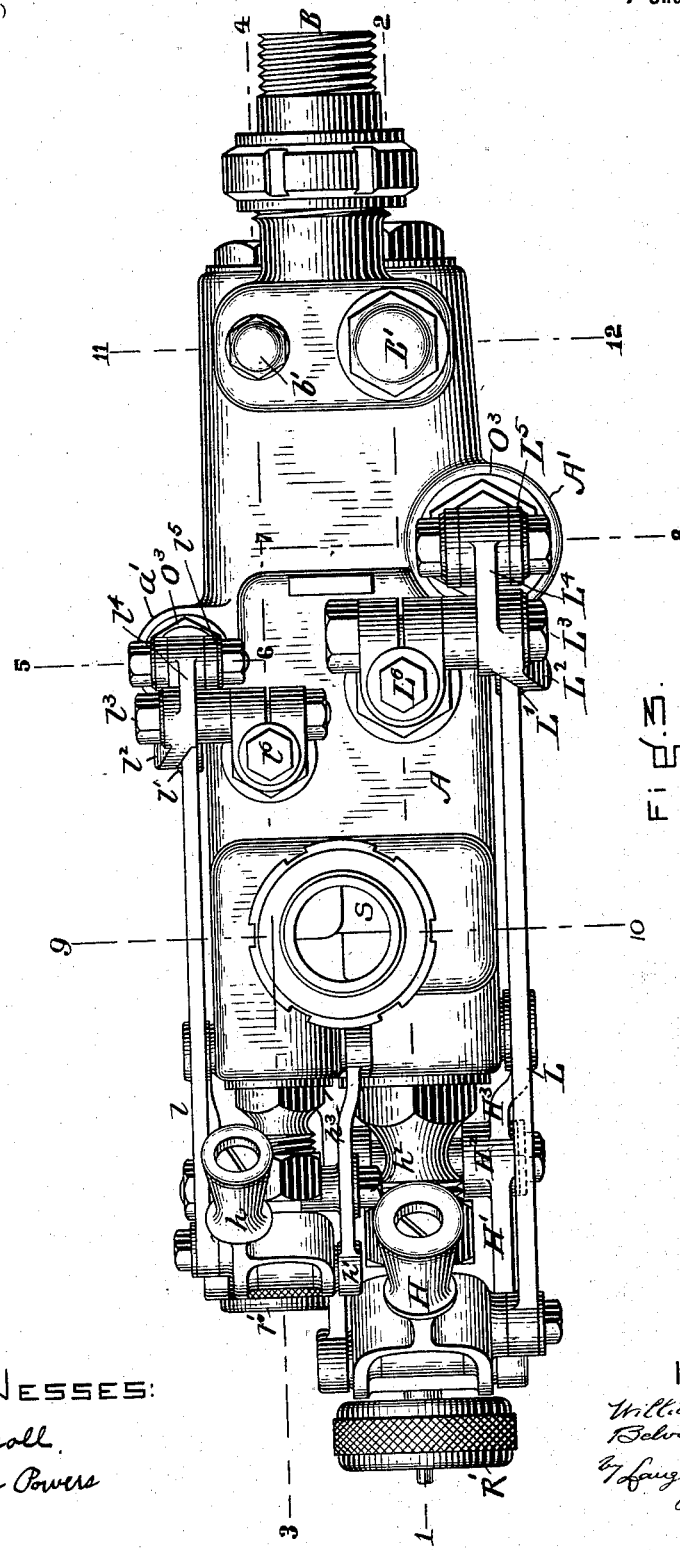
Figure 4:
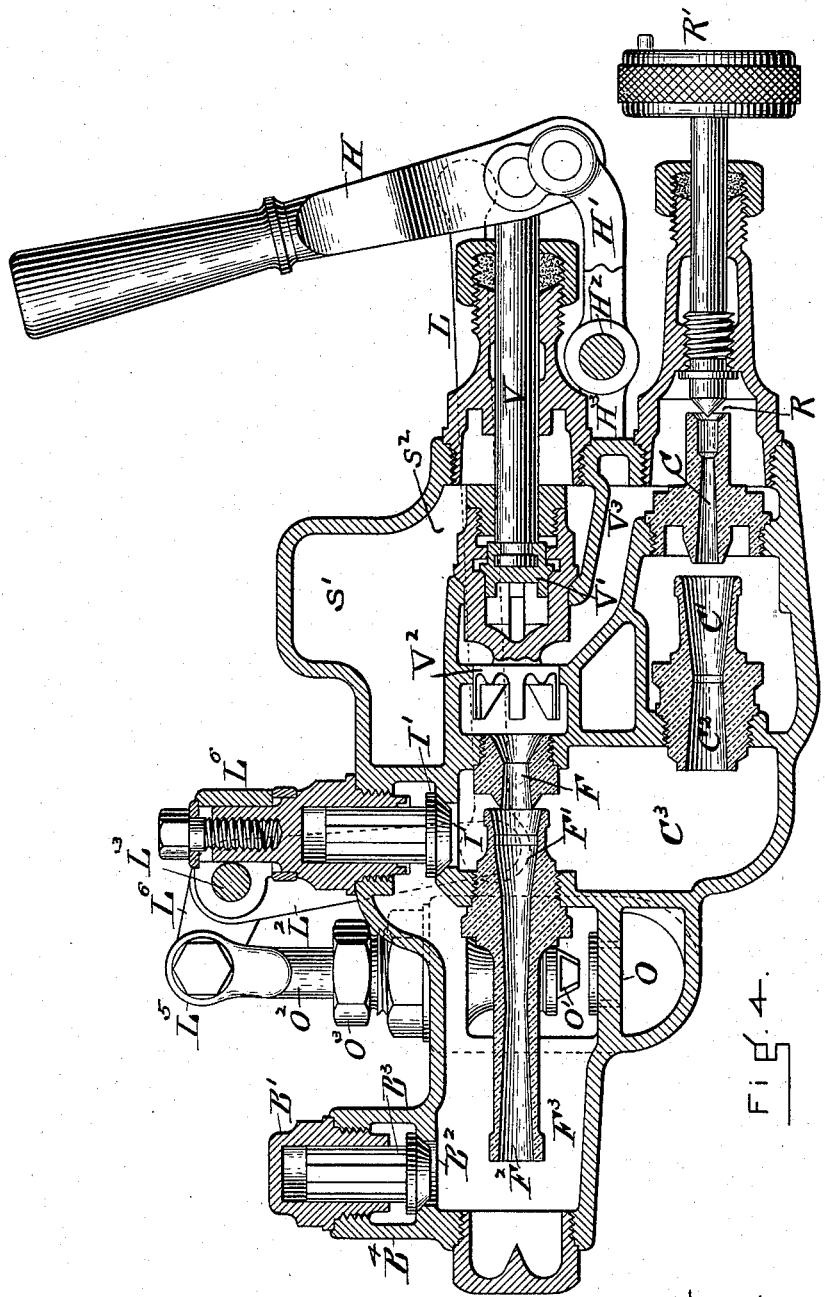
Figure 5:
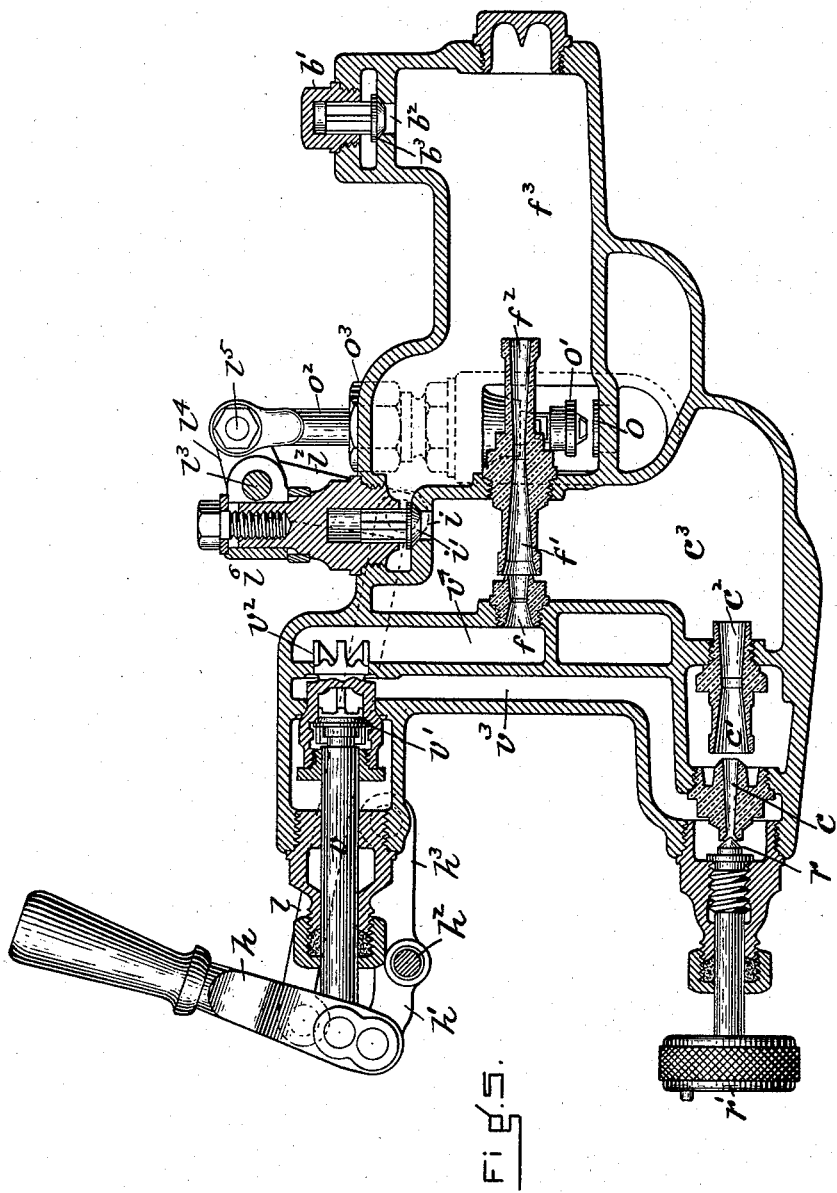
Figure 6:
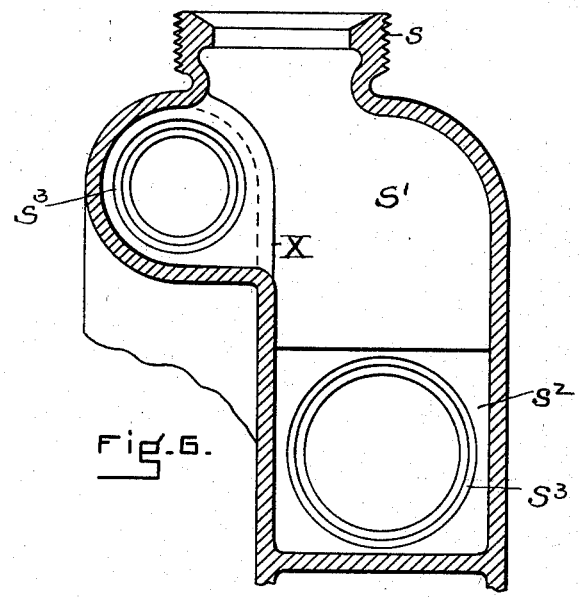
Fig. 6 is a transverse section of a portion of the inspirator-casing, taken at the line 9 10 in Fig. 3, looking from the handle end of the inspirator. The steam-entrance S admits steam to a steam-dome S'. $S^3 s^3$ are respectively the seats for the valves V' v'.
Figure 10:
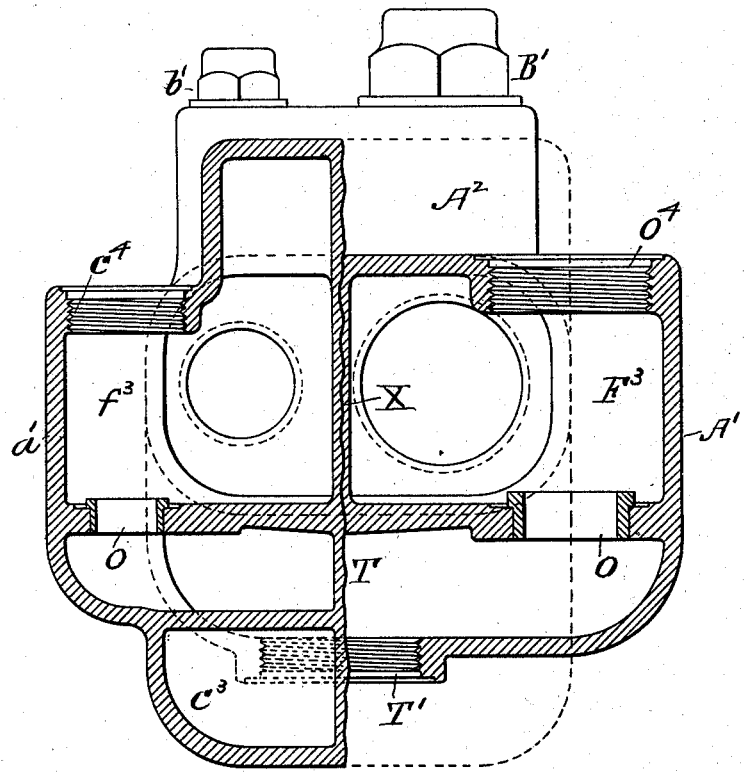

Fig. 10 is a section on line 5 6 7 8 of Fig. 3 looking from the handle end of the injector and shows the forcer delivery-chambers $F^3 f^3$ of the larger and smaller injectors, respectively. The seats $O^4 o^4$ for the final-overflow-valve-stem bonnets $O^3 o^3$, the final-overflow outlets O o, situated in the compartments A' a' of the main casing, and a portion of the lifter delivery-chamber $c^3$ in the smaller injector also appear in this section. The two overflow-outlets O o deliver to a common chamber T, from which the final outlet is at T'. The boiler delivery-dome $A^2$, with the valve-plugs B' b', appears in elevation in this figure.

Figure 11:
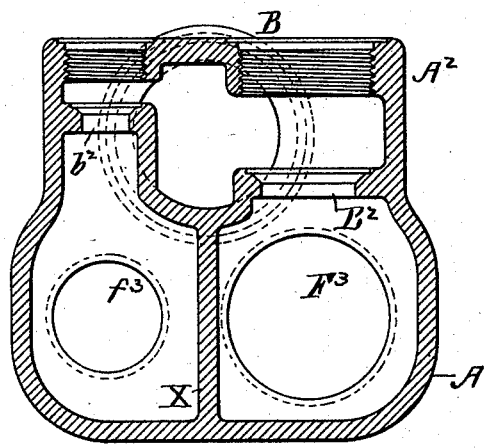

A section of the main casing at line 11 12 of Fig. 3 is shown in Fig. 11. Integral with the casing A is the boiler delivery-dome $A^2$, which communicates with the forcer delivery-chambers $F^3 f^3$ through ports $B^2 b^2$ and with the boiler through the pipe B.

In sectional Figs. 6, 8, 9, 10, and 11 the longitudinal web X is shown in various portions of the composite injector.

What we claim, and desire to secure by Letters Patent, is—

1. In a composite injector, a main casing comprising isolated chambered divisions, a complete assemblage of injector-tubes in each division, a common steam-chamber communicating with the steam-tubes of the several injectors, suction-pipes, isolated from each other, a suction-pipe for each injector, overflow-outlets from each isolated injector-division of the main casing, boiler delivery-ports from the several injector-chambers and boiler check-valves controlling the said ports, respectively; and external devices whereby the said several injectors are respectively operated, substantially as described.

2. In a composite injector, a main casing comprising isolated chambered divisions, a complete assemblage of injector-tubes in each division, a common steam-chamber communicating with the steam-tubes of the several injectors, suction-pipes, isolated from each other, a suction-pipe for each injector, overflow-outlets from each isolated injector-division of the main casing, a boiler delivery-chamber common to the several injectors, boiler check-valves in the said boiler delivery-chamber controlling the boiler delivery-ports of the several injectors, respectively, and external devices whereby the said several injectors are respectively operated, substantially as described.

Signed by us at Boston this 28th day of May, 1898.

WILLIAM R. PARK.
BELVIN T. WILLISTON.

Witnesses:
  E. F. GROLL,
  EDWARD POWERS.